US007807606B2

(12) United States Patent
Tranter et al.

(10) Patent No.: US 7,807,606 B2
(45) Date of Patent: *Oct. 5, 2010

(54) HIGH CAPACITY ADSORPTION MEDIA AND METHOD OF PRODUCING

(75) Inventors: Troy J. Tranter, Idaho Falls, ID (US); Nicholas R. Mann, Blackfoot, ID (US); Terry A. Todd, Aberdeen, ID (US); Ronald S. Herbst, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1088 days.

This patent is subject to a terminal disclaimer.

(21) Appl. No.: 11/210,577

(22) Filed: Aug. 23, 2005

(65) Prior Publication Data

US 2005/0288181 A1 Dec. 29, 2005

Related U.S. Application Data

(63) Continuation-in-part of application No. 10/656,028, filed on Sep. 4, 2003, now Pat. No. 7,368,412.

(51) Int. Cl.
*B01J 21/04* (2006.01)

(52) U.S. Cl. .................................. 502/439; 502/414

(58) Field of Classification Search .................. 502/400, 502/401, 402, 404, 414, 439
See application file for complete search history.

(56) References Cited

U.S. PATENT DOCUMENTS

| | | | |
|---|---|---|---|
| 4,039,444 A | 8/1977 | Bory et al. | |
| 4,576,969 A | 3/1986 | Echigo et al. | |
| 5,591,346 A | 1/1997 | Etzel et al. | |
| 5,788,826 A | 8/1998 | Nyberg | |
| 5,895,796 A | 4/1999 | Mouri et al. | |
| 6,001,258 A | 12/1999 | Sluys et al. | |
| 6,045,697 A | 4/2000 | Girot et al. | |
| 6,136,199 A | 10/2000 | SenGupta et al. | |
| 6,232,265 B1 | 5/2001 | Bruening et al. | |
| 6,290,848 B1 | 9/2001 | Tanner et al. | |
| 6,461,535 B1 | 10/2002 | de Esparza | |
| 6,641,719 B1 | 11/2003 | Naito | |
| 6,656,350 B2 | 12/2003 | Kitakaze | |
| 6,809,062 B2 | 10/2004 | Driehaus | |
| 6,881,327 B2 | 4/2005 | Tanner et al. | |
| 6,881,333 B2 | 4/2005 | Ozeki et al. | |
| 6,914,034 B2 | 7/2005 | Vo | |
| 7,368,412 B2 * | 5/2008 | Tranter et al. ............... 502/406 |
| 7,429,551 B2 | 9/2008 | Vo | |
| 2002/0121470 A1 | 9/2002 | Mann et al. | |

OTHER PUBLICATIONS

Chanda, et al., "Ligand Exchange Sorption of Arsenate and Arsenite Anions by Chelating Resins in Ferric Ion Form: I. Weak-Base Chelating Resin Dow XFS-4195," Reactive Polymers, 7 (1988) pp. 251-261.
Chanda, et al., "Ligand Exchange Sorption of Arsenate and Arsenite Anions by Chelating Resins in Ferric Ion Form: II. Iminodiacetic Chelating Resin Chelex 100," Reactive Polymers, 8 (1988) pp. 85-95.
DeMarco, et al., "Arsenic Removal Using a Polymeric/Inorganic Hybrid Sorbent," Water Research 37 (2003) pp. 164-176.
Janney et al., "Structure of synthetic 2-line ferrihydrite by electron nanodiffraction," American Mineralogist, vol. 85, pp. 1180-1187, 2000.
Janney et al., "Structure of synthetic 6-line ferrihydrite by electron nanodiffraction," American Mineralogist, vol. 86, pp. 327-335, 2001.
McKenzie et al., "Direct electrochemistry of nanoparticulate FeO3 in aqueous solution and adsorbed onto tin-doped indium oxide," Pure Apl. Chem., vol. 73, No. 12, pp. 1885-1894, 2001.
Navratil, James D., "Adsorption and Nanoscale Magnetic Separation of Heavy Metals from Water," Clemson University, 8 pages, no date.
Parkinson, Gordon, "Crystallisation Program," pp. 74-83,, 2004.
Ramana, et al., Removing Selenium(IV) and Arsenic (V) Oxyanions with Tailored Chelating Polymers, Journal of Environmental Engineering, Vol. 118, No. 5, Sep./Oct. 1992, pp. 755-775.

(Continued)

*Primary Examiner*—Edward M Johnson
(74) *Attorney, Agent, or Firm*—TraskBritt

(57) ABSTRACT

A method of producing an adsorption medium to remove at least one constituent from a feed stream. The method comprises dissolving and/or suspending at least one metal compound in a solvent to form a metal solution, dissolving polyacrylonitrile into the metal solution to form a PAN-metal solution, and depositing the PAN-metal solution into a quenching bath to produce the adsorption medium. The at least one constituent, such as arsenic, selenium, or antimony, is removed from the feed stream by passing the feed stream through the adsorption medium. An adsorption medium having an increased metal loading and increased capacity for arresting the at least one constituent to be removed is also disclosed. The adsorption medium includes a polyacrylonitrile matrix and at least one metal hydroxide incorporated into the polyacrylonitrile matrix.

21 Claims, 4 Drawing Sheets

OTHER PUBLICATIONS

Thieme, Trevor, "Newsfiles, Like a Cup of Arsenic? Oh, You've Already Got Some" Popular Science, http://www.popsci.com/popsci/science/article/0,12543,195220,00.html, 2003, 2 pages.

PCT International Search Report from PCT/US04/27877, dated Nov. 10, 2005.

PCT Written Opinion of the International Searching Authority from PCT/US04/27877, dated Nov. 10, 2005.

Bowen, H. J. M. (1979). Elemental Chemistry of the Elements, Academic Press, London and New York, 13-62.

Pandey, P. K., Yadav, D., Bhui, a. Arsenic Contamination of the Environment. A New Perspective from Central-East India. Environ. Int., 28, 235-245, 2002.

Nickson, R., McArthur, J, Burgess, W. Arsenic Poisoning in Bangladesh Groundwater. Nature, 395, 338-348, 1998.

Das, D., Samanta, G., Mandal, B. K., Chowdhury, T. R., Chandra, C. R., Chowdhurry, P. P. , Basu, G. K., Chakraborti, D. Arsenic in Groundwater in Six Districts of West Bengal, India. Environ. Geochem. Hlth., 18, 5-15, 1996.

Masud, K. Arsenic in Groundwater and Health Problems in Bangladesh. Water Research, 34, 304-310, 2000.

Del Razo, L. M., Arellano, M.A., Cebrian, M. E. The Oxidation States of Arsenic in Well Water from a Chronic Arsenicism Area of Northern Mexico. Environmental Pollution, 64, 143-153, 1990.

Borgono, J. M., Vincent, P., Venturino, H., Infante, A. Arsenic in the Drinking Water of the City of Antofagasta: Epidemiological and Clinical Study before and after Installation of a Treatment Plant. Environmental Health Perspectives, 19, 103-105, 1997.

Chen, S. L., Dzeng, S. R., Yang, M. H., Chiu,, K. H., Shieh, G. M., Wai, C. M. Arsenic Species in Groundwaters of he Blackfoot Disease Area, Taiwan. Environmental Science and Technology, 28, 877-881, 1994.

Arsenic in Drinking Water: 2001 Update, National Research Council, National Academy Press, 24-69, 2001.

SenGupta, A.K., Greenleaf, J. E. Arsenic in Subsurface Water: Its Chemistry and Removal by Engineered Processes. Environmental Separation of Heavy Metals, Edited by A. K. SenGupta, 265-306, Lewis Publishers, CRC Press, Boca Raton, FL, 2002.

Chwirka, J. D., Thomson, B. M., Stomp, J. M. Removing Arsenic from Groundwater. Jour. American WaterWorks Assoc., 92(3), 79-88, 2000.

Schwertmann, U., Cornell, R. M. Iron Oxides in the Laboratory, 2nd Ed., WILEY-VCH, Weinheim, Germany, 5-18, 2000.

Nickolaidis, N. P., Dobbs, G. M., Lackovic, J. A. Arsenic Removal by Zero-Valent Iron: Field, Laboratory and Modeling Studies. Water Research, 37, 1417-1425, 2003.

Chakravarty, S., Durega, V., Bhattacharyya, G., Maity, S., Bhattacharjee, S. Removal of Arsenic from Groundwater Using Low Cost Ferruginous Manganese Ore. Water Research, 36, 625-632, 2002.

Dambies, L. Existing and Prospective Sorption Technologies for the Removal of Arsenic in Water. Separation Science and Technology, 39(3), 603, 627, 2004.

Tokunaga, S., Wasay, S. A., Park, S. Removal of Arsenic(V) Ion from Aqueous Solutions by Lanthanum Compounds. Water Science and Technology, 35(7), 71-78, 1997.

Wasay, S. A., Haron, J., Uchiumi, A., Tokunaga, S. Removal of Arsenite Ions from Aqueous Solution by Basic Yttrium Carbonate. Water Research, 30(5), 1143-1148, 1996.

Daus, B., Wennrich, R., Weiss, H. Sorption Materials for Arsenic Removal from Water: A Comparative Study. Water Research, 38, 2948-2954, 2004.

Sun, X., Doner, H. E. Adsorption and Oxidation of Arsenite on Geothite. Soil Science, 163(4), 278-287, 1998.

Gulledge, J. H., O'Conner, J. T. Removal of Arsenic(V) from Water by Adsorption on Aluminum and Ferric Hydroxides. Jour. American WaterWorks Assoc., 548-552, 1973.

Roberts, L. C., Hug, S. J., Ruettimann, T., Billah, M., Khan, A. W., Rahman, M. T. Arsenic Removal with Iron (II) and Iron (III) in Waters with High Silicate and Phosphate Concentrations. Environmental Science and Technology, 38, 307-315, 2004.

Jambor, J. L., Dutrizac, J. E. Occurrence and Constitution of Natural and Synthetic Ferrihydrite, a Widespread Iron Oxyhydroxide. Chem. Rev., 98, 2549-2585, 1998.

* cited by examiner

HIGH CAPACITY ADSORPTION MEDIA AND METHOD OF PRODUCING

CROSS-REFERENCE TO RELATED APPLICATION

This application is a continuation-in-part of U.S. patent application Ser. No. 10/656,028, filed Sep. 4, 2003, now U.S. Pat. No. 7,368,412, issued May 6, 2008, the entirety of which is incorporated by reference.

GOVERNMENT RIGHTS

The United States Government has certain rights in the following invention pursuant to Contract No. DE-AC07-99ID13727, and Contract No. DE-AC07-05ID14517 between the United States Department of Energy and Battelle Energy Alliance, LLC.

FIELD OF THE INVENTION

The present invention relates to an adsorption medium that may be used to remove an undesirable constituent from a water supply. More specifically, the present invention relates to an adsorption medium that includes polyacrylonitrile and a metal hydroxide or metal oxide, associated apparatus incorporating same, and methods of producing and using the medium.

BACKGROUND OF THE INVENTION

Water supplies contaminated with arsenic (As) are a major health and environmental concern in the United States and worldwide. Arsenic is a naturally occurring element that is present in rocks or soils. Over time, the arsenic leaches from the rocks or soils into groundwater, surface water, wells, or other sources of drinking water. This arsenic contamination is referred to as indigenous arsenic contamination. Arsenic-contaminated solutions are also produced in a variety of industries, such as mining, agriculture, semiconductor, or petroleum industries. These arsenic-contaminated (As-contaminated) solutions include process solutions and waste streams. The ingestion of significant amounts of arsenic can lead to disastrous effects on human health, which has become well documented in parts of the Indian subcontinent, where tube wells have replaced surface water as the primary drinking water source. Many of the worst cases of arsenic poisoning have occurred in the West Bengal area, where As concentrations in the drinking water can exceed 300 parts per billion (ppb). Health problems due to the consumption of As-contaminated water currently affect over 70 million people in Bangladesh. However, the deleterious consequences of lesser concentrations of As in drinking water are becoming evident in other parts of the world as well, e.g., Mexico, Argentina, and Taiwan. In September 2001, a National Academy of Science study concluded that even trace amounts of arsenic can cause bladder and lung cancer.

In 1976, the Environmental Protection Agency (EPA) established drinking water standards for arsenic at a maximum concentration limit (MCL) of 50 µg/L or 50 parts per billion (ppb). However, even trace amounts of arsenic have been shown to have health risks, which led the EPA to further reduce the MCL to 10 ppb. The reduced MCL will be enforced in 2006, which provides only a few years for development and testing of improved technologies for arsenic removal. Because of the health risks and MCL, the total As treatment market is expected to eventually exceed a billion dollars per year in the U.S. alone.

It is expected that large cities, which typically have centralized water treatment facilities, could comply with the new MCL for arsenic using existing technologies, such as precipitation or coagulation treatment. However, a pilot-scale testing of sorption on activated alumina (AA), coagulation with alum or ferric dosage followed by filtration, and ion exchange technologies was performed to determine the most feasible option for a full-scale treatment plant to be installed in Albuquerque, N. Mex. It was estimated that the capital costs would be approximately the same for all options. While the operating costs of the coagulation approach would be approximately 60% of the other two methods, for the 2.3 million gallon/day facility considered in the study, this still amounts to between $0.60 and $0.80 per thousand gallons treated; a cost that must be recovered from the customer.

In addition to the costs associated with such treatment facilities, small and mid-sized municipalities, as well as rural areas, do not have centralized water treatment facilities. Rather, they typically use point-of-origin treatment schemes, such as chlorination, at the well head prior to distribution. It is estimated that over four thousand municipal water supplies and tens of thousands of private drinking water supplies, primarily in the western United States and New England, would not meet the new MCL standard of 10 ppb arsenic, since the majority of these water supplies have As concentrations between 10 and approximately 25 ppb. Under existing technologies, these small and mid-sized municipalities and private users would have to build centralized water treatment facilities in order to comply with the new MCL.

Due to a smaller customer base, it is not economically feasible for these suppliers to build a conventional treatment facility at each point of origin or a centralized treatment facility, which would be required for current arsenic removal technologies. Thus, a new adsorbent or ion-exchange material with a high arsenic removal capacity would provide an economical treatment alternative for the small to mid-sized suppliers. For example, a material of this type may be used in a packed bed (similar to a water softener) at the well head or point of origin to remove arsenic from potable water prior to distribution. This approach would provide an arsenic removal system that could meet the new MCL, with much lower capital and operating cost than that required for a conventional treatment facility. Therefore, new technologies for removing arsenic need to be developed to meet the new MCL for arsenic.

Arsenic is present in nature in valence states or oxidation states of +3 and +5. In water supplies, arsenic contaminants typically exist as As(III) compounds and/or As(V) compounds. The As(III) compounds include As(III) oxyanions or oxyacids, such as $H_3AsO_3$ or $H_2AsO_3^{1-}$, depending on the pH of the water supply. The As(V) compounds include As(V) oxyanions, such as $H_2AsO_4^-$ or $HAsO_4^{2-}$, or oxyacids, such as $H_3AsO_4$, depending on the pH of the water supply. Under atmospheric conditions or an oxidizing environment, As(V) compounds are predominantly present in water supplies. As(III) compounds are also known as arsenites, while As(V) compounds are known as arsenates.

Numerous techniques for removing arsenic from water supplies have been proposed and developed. For instance, arsenic removal has utilized anion exchange, cation exchange, polymeric anion exchange, liquid-liquid extraction, activated alumina sorption, coprecipitation, sorption by iron oxide-coated sand particles, enhanced coagulation with alum or ferric chloride dosage, ferric chloride coagulation followed by microfiltration, pressurized granulated iron particles, iron oxide doped alginate, manganese dioxide-coated sand, polymeric ligand exchange, and zero-valent iron. These techniques primarily rely on ion exchange and Lewis acid-base interactions to remove the arsenic.

In U.S. Pat. No. 5,591,346 to Etzel et al., an iron(III)-complexed cation exchange resin is disclosed for removing arsenic from wastewater or drinking water. The iron(III)-complexed cation exchange resin is formed by loading a strong acid cation exchange resin with iron ions. The cation exchange resin is purchased commercially and then loaded with the iron ions. When the iron(III)-complexed cation exchange resin is contacted with a stream of wastewater or drinking water, the iron ions react with arsenate anions to form an iron arsenate salt complex. The iron arsenate salt complex is immobilized on the cation exchange resin, removing the arsenic from the wastewater or drinking water.

While many techniques for removing arsenic from water supplies are known, conventional ion exchange resins do not provide the specificity to economically remove low concentrations of arsenic. Since many water supplies in the United States, such as groundwater, surface water, or wells, have low concentrations of arsenic, these techniques are not effective to remove the arsenic. In addition, many of these techniques are not selective for arsenic over other ions. To improve the selectivity of ion exchange resins for arsenic, granules of metal oxides or metal hydroxides, such as ferric hydroxide, have also been investigated. While these metal oxide or metal hydroxide granules are more selective for arsenic, they have a low porosity and, therefore, have a low capacity for arsenic and poor kinetic properties. To improve the performance of ferric hydroxide, ferric hydroxide has been incorporated into organic polymers. For instance, in "Arsenic Removal Using a Polymeric/Inorganic Hybrid Sorbent," DeMarco et al., *Water Research* 37 (2003) 164-176, a hydrated iron oxide is dispersed into a polymeric, cation exchange bead. The polymeric, cation exchange beads are commercially available and include a polystyrene matrix having sulfonic acid functional groups. A sorbent is prepared by loading Fe(III) onto the sulfonic acid sites on the cation exchange beads. The Fe(III) is then desorbed and Fe(III) hydroxides are simultaneously precipitated within the cation exchange beads using a strong alkaline solution, encapsulating the hydrated iron oxides within the cation exchange beads. The capacity of the sorbent for arsenic is limited by the total number of sulfonic acid sites on the cation exchange beads. In this sorbent, the hydrated iron oxide is loaded at approximately 0.9% to 1.2% by mass. In other words, only 9 mg of iron per gram of sorbent is loaded at saturation.

In further attempts to improve techniques for removing arsenic from water supplies, an ion exchange resin for removing trace amounts of ions is disclosed in U.S. Pat. No. 4,576,969 to Echigo et al. The ion exchange resin includes a phenolic resin and a metal hydroxide. The ion exchange resin is formed by incorporating a metal salt or metal oxide into the phenolic resin, which is prepared by precondensating a phenol compound with an aldehyde compound and an acid catalyst. The mixture of the metal salt or metal oxide and the phenolic resin is then subjected to a suspension polycondensation reaction in halogenated solvents. The ion exchange resin is isolated from the reaction mixture and treated with an alkaline agent to produce a spherical ion exchange resin. However, the foregoing process of preparing this ion exchange resin is problematic because it is complicated and the halogenated solvents used in the process are difficult to dispose of.

Hence, there is a need in the art for an economical and effective means of removing As from a water supply.

BRIEF SUMMARY OF THE INVENTION

The present invention relates to a method of producing an adsorption medium. The method comprises dissolving at least one metal compound in a solvent to form a metal solution. The at least one metal compound may be a metal salt or a metal oxide of a divalent, trivalent, or tetravalent metal. The metal salt or metal oxide may be a salt or oxide of a transition metal, a rare earth metal, a Group III metal, a Group IV metal, or a Group V metal, such as iron, zirconium, lanthanum, cerium, titanium, aluminum, tin, silver, zinc, mercury, bismuth, copper, antimony, tungsten, and molybdenum. The active compound is then dissolved or suspended and a matrix compound is added, to form a matrix-metal solution, which is deposited into a quenching bath. In an exemplary embodiment, the matrix compound is Polyacrylonitrile (PAN). The quenching bath may include an alkaline agent, such as from approximately 0.1 M sodium hydroxide to approximately 8 M sodium hydroxide. The adsorption medium may be produced by precipitating a metal hydroxide and/or metal oxide from the PAN-metal solution/suspension and insolubilizing the PAN from the PAN-metal solution/suspension. The adsorption medium may also be produced by suspending a metal hydroxide and/or metal oxide in the PAN-metal solution/suspension and insolubilizing the PAN from the PAN-metal solution/suspension. The adsorption medium may include solid beads in which the metal hydroxide and/or metal oxide is incorporated into the PAN. Alternatively, a support, such as a filter, may be impregnated with the adsorption medium. The adsorption medium may include from approximately 10% by weight to approximately 85% by weight of a metal in the form of an elemental metal and the at least one metal hydroxide and/or metal oxide and from approximately 15% by weight to approximately 90% by weight of the matrix, e.g., PAN.

The present invention also relates to a method of removing a constituent from a feed stream. The method comprises providing an adsorption medium having at least one metal hydroxide and/or metal oxide dispersed in a matrix, e.g., PAN. The adsorption medium may have from approximately 10% by weight to approximately 90% by weight of a metal in the form of an elemental metal and at least one metal hydroxide and/or metal oxide and from approximately 10% by weight to approximately 90% by weight of the matrix, such as PAN. The adsorption medium is contacted with a feed stream comprising at least one constituent, such as a feed stream comprising arsenic, selenium, antimony, or mixtures thereof. The adsorption medium is used to remove oxyanions or oxyacids of arsenic, selenium, or antimony from the feed stream. The adsorption medium may reduce the amount of arsenic present in the feed stream to less than approximately 50 parts per billion, such as less than approximately 10 parts per billion.

The present invention also relates to an adsorption medium having increased metal loading. In an exemplary embodiment, the adsorption medium comprises a PAN matrix and at least one metal hydroxide and/or metal oxide. The adsorption medium has from approximately 10% by weight to approximately 90% by weight of a metal in the form of an elemental metal and at least one metal hydroxide and/or metal oxide and from approximately 10% by weight to approximately 90% by weight of the PAN. The metal hydroxide and/or metal oxide may be substantially homogenously dispersed in the PAN matrix. The adsorption medium may comprise at least approximately 50% by weight of the elemental metal and at least one metal hydroxide and/or metal oxide. In an exemplary embodiment, the adsorption medium has approximately 85% by weight of a metal in the form of an elemental metal and at least one metal hydroxide and/or metal oxide and approximately 85% by weight of the matrix.

The present invention also relates to an adsorption medium for the removal of arsenic from drinking water. The adsorption medium comprises hydrous iron oxide nanoparticles with surface areas in excess of three hundred square meters per gram (300 m$^2$/g). In one embodiment, the adsorption medium may comprise hydrated iron oxide or oxyhydroxide (HIO) and has a surface area of the dried aggregate greater than approximately 300 m$^2$/g, for example, ranging from about 300 to about 375 m$^2$/g, or more preferably, from about 325 to about 350 m$^2$/g. The synthesized metal oxide particles, for example, HIO, may be added to (e.g., suspended in) PAN-metal solution/suspension and composite beads of a desired size range formed by spraying this solution/suspension into a quenching bath. In another embodiment, the matrix-HIO composition, e.g., PAN-HIO, has a surface area greater than approximately 200 m$^2$/g, more preferably, approximately 300 m$^2$/g.

The invention also relates to a composition of HIO-PAN and a method for producing HIO. The invention also relates to an adsorption medium that may be regenerated multiple times, for example, with a dilute caustic, without significantly reducing the arsenic sorption capacity.

Further, the invention relates to a cartridge-type device or apparatus comprising the adsorption medium of the present invention.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1:
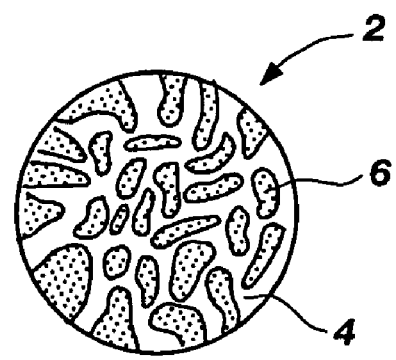
FIG. 1 is a schematic illustration of an embodiment of an adsorption medium of the present invention.

An adsorption medium having increased metal loading and increased capacity is produced. The adsorption medium 2 includes a matrix 4 and at least one active component 6, as shown in FIG. 1. The at least one active component 6 may be dispersed within the pores of the matrix 4 and be affixed or absorbed to the matrix 4. In one embodiment, the at least one active component 6 is synthesized during formation of the adsorption medium 2, enabling increased loading of the at least one active component 6. In another embodiment, the at least one active component 6 having a high surface area, enabling increased loading of the at least one active component 6, is synthesized prior to formation of the adsorption medium 2.

The adsorption medium 2 may be used to remove at least one constituent from a feed stream. The feed stream may be, for example, a drinking water source or an industrial water stream having at least one constituent that is to be removed. The drinking water source may include groundwater, surface water, well water, or other drinking water sources. The industrial water stream may be a process solution or a waste stream generated by an industrial process, such as a stream generated by the mining, agriculture, semiconductor, or petroleum industry. The at least one constituent to be removed may be an undesirable component of the feed stream, such as a component that produces health risks when ingested by humans or other mammals. For sake of example only, the at least one constituent may include, but is not limited to, arsenic, selenium, and antimony compounds.

The matrix 4 may be an inert substrate, such as PAN, polystyrene or other matrix compounds known in the art. As used herein, the term "PAN" refers to an acrylonitrile homopolymer or a copolymer containing at least about 40% acrylonitrile units. For instance, the PAN may be an acrylonitrile polymer or a copolymer having a ratio of at least about 40% acrylonitrile molecules to total molecules. PAN may be provided in a solid form. The acrylonitrile homopolymer may include crystalline, quasicrystalline, and/or amorphous phases. The matrix 4 may be constituted to enable formation thereof into a plurality of small, porous, particles, which are also referred to herein as beads. PAN is an organic polymer that is easily formed into spherical beads having a high surface area and/or macroporous properties. However, additional organic and inorganic polymers having these properties, such as polystyrene, may also be used as the matrix 4, provided that the polymer is soluble in a solvent used to produce the adsorption medium 2 and is compatible with the at least one active component 6. Hence, PAN is used herein as an example of the matrix compound; however, a person of ordinary skill in the art, using the guidance of the present disclosure, may utilize other matrix compounds.

An active component 6 may be selected for its ability to remove the constituent from the feed stream. For sake of example only, the active component 6 may be a metal hydroxide and/or a metal oxide that is incorporated, or physically trapped, in the matrix 4. The active component 6 may be a hydroxide and/or an oxide of a divalent, trivalent, or tetravalent metal, such as a hydroxide and/or an oxide of a transition metal, a lanthanide or rare earth metal, a Group III metal, a Group IV metal, or a Group V metal. For instance, the active component 6 may be a hydroxide and/or an oxide of iron, zirconium, lanthanum, cerium, titanium, aluminum, tin, silver, zinc, mercury, bismuth, copper, antimony, tungsten, molybdenum. The active component 6 may also include mixtures of metal hydroxides and/or mixtures of metal oxides that are incorporated in the matrix 4. For the sake of example only, a mixture of ferric hydroxide and ferrihydrite, or ferric hydroxide, lanthanum hydroxide, and titanium hydroxide may be present in the matrix 4. By utilizing the mixture of metal hydroxides and/or mixtures of metal oxides, the adsorption medium 2 may be tailored to remove specific oxidation states of arsenic, selenium, or antimony, depending on which constituents are present in the feed stream. For the sake of example only, one metal mixture may be more specific to remove As(III) compounds, while a second metal mixture may have increased specificity for As(V) compounds. The metal mixture may also be tailored to selectively remove constituents in the presence of other potentially competing anions, such as phosphates or nitrates.

To produce the adsorption medium 2 having a metal hydroxide and/or metal oxide as the active component 6, at least one metal compound may be dissolved in a solvent to form a metal solution. The metal compound may be a metal salt, a metal oxide, or mixtures thereof. For instance, the metal compound may be a salt or an oxide of a divalent, trivalent, or tetravalent metal, such as a salt or an oxide of a transition metal, a lanthanide or rare earth metal, a Group III metal, a Group IV metal, or a Group V metal. The metal in the metal compound may include, but is not limited to, a cation of iron, zirconium, lanthanum, cerium, titanium, aluminum, tin, silver, zinc, mercury, bismuth, copper, antimony, tungsten, or molybdenum. The metal oxide may be an oxide, a hydroxide, and/or a hydrite of the metal. In one embodiment, the metal cation is iron(III), which is provided as an iron salt or as iron oxide (e.g., $Fe_3O_4$ or $Fe_2O_3$). In another embodiment, the metal cation is iron(III), which is provided as a hydrated iron oxide (e.g., ferrihydrite).

A metal hydrite includes, but is not limited to, hydrated iron oxide (also known as hydrous ferric oxide and ferrihydrite) compounds with varying degrees of structural order, generally named according to the number of broad X-ray peaks they exhibit, e.g., two-line and six-line ferrihydrite. An exemplary ferrihydrite of the invention has a ratio of Fe:H:O of about 1.25:2.25:3.00, proposed formulas include, $5Fe_2O_3.9H_2O$ or $Fe_5HO_8.4H_2O$. The high surface area of the ferrihydrite compounds is believed to be due to the fact that they all exhibit relatively low degrees of structural order, with the two-line variety being the most amorphous and the six-line variety being slightly more crystalline. Although the structures of these compounds are not fully understood, the low degree of crystallinity is generally attributed to vacant Fe sites and to the replacement of some oxygen by $H_2O$ and/or OH.

A metal salt may include, but is not limited to, a chloride, an oxychloride, a sulfate, a nitrate, or an acetate of the metal cation.

As used herein, a "solution" means a solution, a suspension, and a mixture thereof; for example, in one embodiment, PAN and the metal compound are dissolved in a solvent to produce a PAN-metal solution, whereas in another embodiment, PAN is dissolved in a solvent and the metal compound is suspended in the same liquid to produce a PAN-metal solution (also referenced as a PAN-metal solution/suspension). Since a person of ordinary skill in the art will clearly recognize whether a particular reference describes a solution, a suspension or a mixture thereof from the context, for the purposes of readability and claiming the invention, the term "solution" means a solution, a suspension and/or a mixture of a solution and a suspension. Likewise, for the purposes of readability and claiming the invention, the term "solvent," as used herein, includes a solvent according to the customary meaning in the art, as well as the medium in which a particle is suspended.

The solvent used to produce the metal solution may be a mineral or inorganic acid or an organic solvent in which the metal compound and/or the PAN are soluble. In one embodiment, the solvent is concentrated nitric acid ($HNO_3$). In another embodiment, the solvent is dimethylsulfoxide (DMSO), in which the active compound, e.g., HIO, is suspended and the PAN is dissolved to form a PAN-metal solution/suspension. Other solvents include, but are not limited to, aprotic polar organic solvents, such as dimethylformamide, dimethylacetamide, DMSO, sulfolane, ethylene carbonate, and N-methylpyrrolidone; acids, such as concentrated sulfuric acid; and concentrated aqueous solutions of certain inorganic salts, such as lithium bromide, sodium thiocyanate, and zinc chloride. To achieve a maximum concentration of the metal hydroxide or metal hydrite in the adsorption medium 2, the metal compound may be dissolved or suspended in the metal solution in an amount sufficient to provide maximum solubility and/or to achieve a fine particulate suspension or slurry. In other words, a saturated solution or suspension of a metal compound in the solvent may be produced.

For the sake of example only, if the metal hydroxide on the adsorption medium 2 is ferric hydroxide (FeO(OH)), approximately 70 g/L of iron (as a salt or oxide of iron, such as iron oxide ($Fe_3O_4$)), may be dissolved in the solvent. If a maximum concentration of the metal hydroxide is not desired in the adsorption medium 2, the amount of the metal compound in the metal solution may be decreased from the maximum solubility to provide a desired concentration.

The PAN may be dissolved in the metal solution to form a PAN-metal solution. The PAN may be dissolved in the metal solution from approximately 3% by weight (wt %) to approximately 25 wt %. As previously described, PAN is an inert substrate that is readily formed into spherical beads and provides a high surface area adsorption medium 2 in combination with the metal hydroxide and/or metal oxide. However, additional polymers having these properties may be used as the matrix 4, as long as the polymer is soluble in the solvent used in the metal solution. The polymer may also be compatible with the metal compound used in the metal solution. The PAN may be added to the metal solution with slight agitation and heating to dissolve the PAN.

Various techniques may be used to produce the adsorption medium 2 from the PAN-metal solution. Solid beads of the adsorption medium 2 may be formed by spraying the PAN-metal solution through an air/nozzle device into a quenching bath. The air/nozzle device may be a conventional spray nozzle that is adjusted to form droplets of a desired size. The droplets solidify into beads when they contact the quenching bath, for example, by diluting the solvent. The air/nozzle device may also utilize air, or an inert gas (e.g., nitrogen) to accelerate formation or release of the droplets. The droplet size, and/or bead size, can be adjusted to achieve a desired range, for example, by using the appropriate diameter nozzle and adjusting the air or nitrogen flow rate. In one embodiment, the distance from the nozzle to the quenching bath is adjusted to allow the droplets to assume a spherical shape prior to entering the quenching bath. The quenching bath preferably causes the PAN from the PAN-metal solution/suspension to precipitate and incorporate the metal hydroxide and/or metal oxide. The quenching bath may also cause the metal hydroxide and/or metal oxide to precipitate from the PAN-metal solution/suspension and become incorporated into the PAN. The quenching bath may be an aqueous solution; for example, in one embodiment, the quenching bath comprises an alkaline aqueous solution that includes an alkaline agent, such as sodium hydroxide or potassium hydroxide, and in another embodiment, the quenching bath comprises deionized water. The concentration of an alkaline agent in the alkaline solution may range from approximately 0.1 M to approximately 8 M. Desirably, the concentration of the alkaline agent ranges from approximately 0.5 M to approximately 6 M. More desirably, the concentration of the alkaline agent is approximately 1 M. The quenching bath may be constantly stirred while the PAN-metal solution/suspension is sprayed into it.

In an exemplary embodiment, the alkaline agent in the quenching bath may cause the metal compound in the droplets of the PAN-metal solution/suspension to dissociate into a metal cation and an anion. Upon contact with the quenching bath, the metal cation reacts with the alkaline solution to form the metal hydroxide, which is water-insoluble. Simultaneously, the PAN in the droplets becomes insoluble in the quenching bath, forming solid beads that have the metal hydroxide incorporated into the PAN.

The metal compound, e.g., metal hydroxide, metal oxide, and/or metal hydrite, may be homogenously dispersed within the PAN. The quenching bath is used to dilute, remove, and/or neutralize the solvent in the droplets, causing the PAN to become insoluble and solidify. Since the active component 6 of the adsorption medium 2 may be produced from a metal oxide or metal salt during the formation of the adsorption medium 2, the adsorption medium 2 may have an increased metal loading compared to the metal loading in conventional ion exchange resins. The metal loading of the adsorption medium 2 may be up to approximately fifty times the metal loading achieved with conventional ion exchange resins. In one embodiment where ferric hydroxide is the active component 6, the metal loading of the adsorption medium 2 ranges from approximately 250 mg of iron per gram of the adsorption medium 2 to approximately 300 mg of iron per gram of the adsorption medium 2. With the increased loading, the solid beads may have an increased capacity for the constituents compared to the capacity of conventional ion exchange resins. The solid beads may include from approximately 10 wt % to approximately 90 wt % of the metal in the form of an elemental metal, metal hydroxide and/or metal oxide. The solid beads having the metal hydroxide and/or metal oxide incorporated into the PAN are removed from the quenching bath, rinsed, dried, and screened to obtain a desired size fraction of the solid beads. The solid beads may have the metal hydroxide and/or metal oxide incorporated into, or physically trapped in, the matrix 4. In one embodiment, the solid beads may include at least approximately 50 wt % of the metal in the form of the elemental metal, metal hydroxide and/or metal oxide, such as approximately 85 wt % metal hydrite. For the sake of example only, if iron oxide is used as the metal compound, the resulting solid beads may include at least 50 wt % iron in the form of Fe(III) and/or FeO(OH).

The solid beads may include PAN. For instance, the solid beads may include from approximately 15 wt% to approximately 90 wt% of the PAN. If the solid beads include a mixture of metals, the PAN may be present from approximately 10 wt% to approximately 20 wt %, including 12%. The solid beads may include from approximately 50 wt % to approximately 90% of the metal in the form of an elemental metal, metal hydroxide and/or metal oxide. In one embodiment, the solid beads include approximately 25 wt % to approximately 30 wt % of Fe(III), which equates to approximately 40 wt % to approximately 60 wt% as FeO(OH), and approximately 40 wt % to approximately 50 wt % PAN. In another embodiment, the solid beads include approximately 85 wt % ferrihydrite and approximately 15 wt % PAN, and may have a final surface area of greater than approximately 200 $m^2/g$, more preferably having a final surface area of approximately 280 to approximately 300 $m^2/g$. Such solid beads have good mechanical properties, which make them valuable in the operation of a fixed-bed. Since PAN, in the absence of a metal hydroxide or metal oxide, produces a bead having a surface area of approximately 20 $m^2/g$, the final surface area of the PAN-metal hydroxide and/or PAN-metal oxide will be decreased relative to metal hydroxide and/or metal oxide in relation to the percentage of PAN in the PAN-metal hydroxide and/or PAN-metal oxide.

In one exemplary embodiment, a metal compound that may be precipitated from the PAN-metal solution, may affect the shape and metal loading of the solid beads that are formed. The precipitation rate of the active component may be adjusted by adjusting the concentration of the metal solution or the alkaline agent in the aqueous alkaline solution of the quenching bath. For example, if the concentration of the alkaline agent is high, a metal hydroxide may precipitate quickly and the solid beads may not be sufficiently spherical. However, loading of the metal hydroxide on the solid beads may be increased. In contrast, if the concentration of the alkaline agent is low, the metal hydroxide precipitates slowly and forms spherical, solid beads. However, these solid beads may have a decreased loading of the metal hydroxide.

A rate at which the active component precipitates from a solution, may affect the shape and size of the precipitate. The precipitation rate of the active component, e.g., ferric hydroxide or HIO, may be adjusted by adjusting the pH of the solution, e.g., the concentration of the alkaline agent in an aqueous solution. For example, if the concentration of the alkaline agent in the solution is high, the metal hydroxide may precipitate quickly and the solid beads may not have the desired surface area.

In another exemplary embodiment, the matrix, e.g., PAN, that is precipitated from the PAN-metal solution/suspension may affect the shape and metal loading of the solid beads that are formed. The precipitation rate of the matrix may be adjusted using methods known in the art so as to produce a solid bead that is sufficiently spherical and/or having optimal loading of the ferric hydroxide or HIO.

Further, the adsorption medium 2 may be impregnated onto a support, such as a filter, disc, or membrane. The support may be a fibrous material, such as a glass wool fiber. A pressure differential, such as a vacuum, may be applied on one side of the filter. The PAN-metal solution/suspension may be applied to the high pressure side of the pressure differential. The pressure differential causes the PAN-metal solution/suspension to flow into, and impregnate, the filter. The impregnated filter may be immersed in a water bath to dilute, remove, or otherwise neutralize the solvent. Diluting the solvent of the PAN-metal solution/suspension may cause the PAN to solidify in the support. For instance, the PAN may solidify, forming a filter disk or a filter medium that includes the PAN and the metal hydroxide and/or metal oxide. In other words, the impregnated support may include the metal hydroxide and/or metal oxide(e.g., metal hydrite) incorporated into, or physically trapped in, the PAN. The adsorption medium 2 may also be used in a cartridge-type treatment device or apparatus.

The cartridge-type treatment device may be threaded onto or otherwise configured for attachment to a water source, for example, a sink tap or hand-pump water tap. In another approach, a small bed of the adsorption medium 2 may be used to treat the water for a single home, e.g., in a manner similar to a water softener. Such a system enables arsenic removal at the point-of-use (POU) or point-of-entry (POE), without treating the entire water supply. Optionally, activated carbon, either packed within a separate cartridge, or within the same cartridge, may be combined with the adsorption medium 2. Cartridge devices, which may be configured in a detachable and attachable manner to a water source, are known in the art, see, for example, U.S. Pat. Nos. 6,881,333, 6,881,327, 6,641,719, 6,656,350, 4,039,444, and 6,290,848, the disclosure of each of which is incorporated herein in its entirety.

The loading of the metal in the adsorption medium 2 and, therefore, the concentration of the metal hydroxide and/or metal oxide in the adsorption medium 2 may be limited by the solubility of the metal when forming a metal solution. In an exemplary embodiment, during formation of the adsorption medium 2, the PAN and the metal cation are each present at the same time in a liquid state. Since the PAN and the metal hydroxide and/or metal oxide in this embodiment are formed into the adsorption medium 2 at the same time and do not require active sites in the matrix compound, the concentration of the metal hydroxide and/or metal oxide in the adsorption medium 2 is not limited by the number of active sites on the adsorption medium 2. In contrast, the metal loading in conventional ion exchange resins, where the metal is added to a preformed ion exchange resin, is limited by the number of active sites on the ion exchange resin. Therefore, the adsorption medium 2 of the present invention may have a metal loading capacity approximately 70 times higher than that of conventional ion exchange resins. The adsorption medium 2 may also have enhanced surface area and porosity, which provides the adsorption medium 2 with an increased removal capacity for the constituents compared to conventional ion exchange resins. In addition, the adsorption medium 2 may be selective for certain constituents, such as arsenic, in the presence of other potentially competing anions, such as phosphate or nitrate.

To produce the adsorption medium 2 having a metal hydroxide and/or metal oxide (e.g., metal hydrite) as the active component 6, the metal hydrite may be prepared by dissolving a Fe salt (typically $Fe_3(NO_3)_3$—$9H_2O$ or $Fe_3Cl_3$—$6H_2O$) in deionized water at room temperature and titrating the solution with constant stirring to a pH of approximately 6.5, for example, using a caustic solution (typically NaOH). The titration is preferably done slowly to avoid local concentrations of high pH (~0.8 M OH/M Fe/min.). A fine precipitate of brown ferrihydrite nanoparticles was produced. The solid ferrihydrite particles were recovered and dried, e.g., overnight at 40° C. The dry ferrihydrite particles may be ground to break up visible aggregates. Typically, it is not necessary to mill or otherwise vigorously grind the particles, it being sufficient to break up the larger aggregates, which facilitates bead formation (spraying). The ferrihydrite particles and matrix 4 may be dispersed and dissolved, respectively, in an organic solvent to form a PAN-metal solution/suspension. For the sake of example only, the organic solvent may be DMSO. Solid beads that include PAN and the metal hydroxide and/or metal oxide may be formed by spraying the PAN-metal solution/suspension through an air/nozzle device into a quenching bath, as previously described, for example, deionized water (e.g., forming a hydrated iron oxide (HIO)-PAN). The solid beads are removed from the quenching bath, rinsed, and dried. Optionally, the solid beads may be screened to obtain a desired size fraction of the solid beads.

Figure 2:
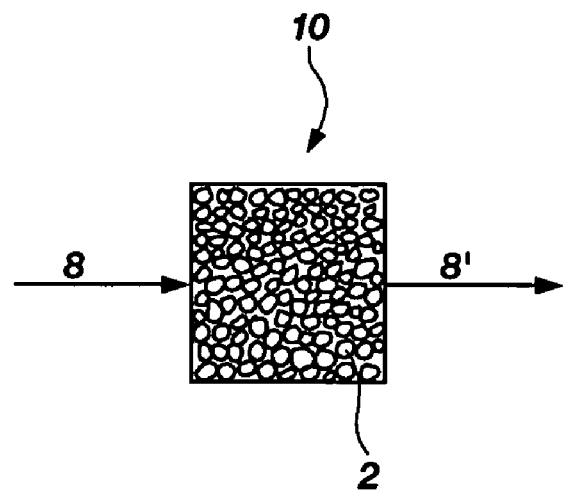
FIG. 2 illustrates the adsorption medium during process conditions.

The adsorption medium 2 of the present invention may be used to remove oxyanion or oxyacid constituents of arsenic, selenium, or antimony from the feed stream 8, as shown in FIG. 2. As previously described, the feed stream 8 includes at least one of these constituents. The feed stream 8 may be a drinking water source or an industrial water stream that is contaminated with at least one of the constituents. For sake of example only, the adsorption medium 2 may be used to remove As(III) oxyacids, such as $H_3AsO_3$ or $HAsO_2$, or As(V) oxyanions or oxyacids, such as $H_3AsO_4$, $H_2AsO_4^-$, or $HAsO_4^{2-}$. The feed stream 8 may be passed through the adsorption medium 2 to remove the arsenic before the feed stream 8 is distributed to users as potable water. The adsorption medium 2 has the capability of removing a substantial portion of the arsenic, even when the arsenic is present in the feed stream 8 at a low concentration. Since the adsorption medium 2 has a high capacity for the constituents, the feed stream 8' that exits the adsorption medium 2 may be substantially free of the constituents. In other words, the feed stream 8' is substantially free of arsenic, selenium, or antimony and, therefore, may be (in the absence of other contaminants) a potable water supply.

To remove the oxyanion or oxyacid constituents of arsenic, selenium, or antimony, the feed stream 8 may be passed through the adsorption medium 2 in a single pass operation. When these constituents contact the metal hydroxide and/or metal oxide in the adsorption medium 2, a metal complex of the constituent may be formed. For the sake of example only, if the feed stream 8 includes arsenic oxyanions or oxyacids and is passed over an adsorption medium 2 that includes ferric hydroxide, the metal complex may be an iron arsenate salt complex or an iron arsenite salt complex. The metal complex is immobilized on the adsorption medium 2 and, therefore, the constituent is removed from the water, e.g., drinking water or waste water. When the adsorption medium 2 is loaded with the metal complexes of the constituents to a maximal capacity, the adsorption medium 2 may be removed and disposed of, such as in a landfill. It is believed that the adsorption medium 2 loaded with the metal complexes of the constituents may meet criteria of the Toxicity Characterization Leaching Procedure (TCLP) and, therefore, may be disposed of. However, the adsorption medium 2 may also be regenerated and reused by treating the adsorption medium 2 loaded with the metal complexes with an alkaline solution.

In one embodiment, the adsorption medium 2 may be used to remove or reduce indigenous arsenic contamination in the feed stream 8 to make the water supply potable. For instance, the adsorption medium 2 may be used to remove arsenic from feed stream 8 having an arsenic concentration of less than approximately 50 ppb. The adsorption medium 2 may be used to reduce the concentration of arsenic to a concentration of less than approximately 10 ppm. Since the adsorption medium 2 provides a large surface area and a consequent increased capacity for arsenic, large volumes of the feed stream 8 may be passed through the adsorption medium 2 before the adsorption medium 2 is loaded to a maximal capacity with the arsenic complexes. Assuming the feed stream has an As concentration of 15 ppb and two beds in series such that the first may be utilized to capacity, one liter of the adsorption medium 2 may be used to treat from approximately 30,000 bed volumes to approximately 400,000 bed volumes of the feed stream 8, for example, HIO-PAN may be used to process approximately 300,000 to 400,000 bed volumes of the feed stream 8. However, the adsorption medium 2 may also be used to remove arsenic from the feed stream 8 having an arsenic concentration of greater than 50 ppb. The adsorption medium 2 may also be used to treat or remediate contaminated surface waters or effluents produced by industrial activities.

An estimate of the ability of the HIO-PAN technology to provide arsenic removal, resulted in an estimated treatment cost of approximately $0.10 to $0.15 per thousand gallons treated (including capital and operating costs). Thus, the estimated treatment cost for HIO-PAN, which must be recovered from the consumer, yielded an estimated reduction in the cost associated with the current technology of at least a factor of 4 or 5.

To effectively remove the constituents, a pH of the feed stream 8 may be at least approximately 6. For instance, the pH of the feed stream 8 may range from approximately 6 to approximately 8.5. In one embodiment, the pH of the feed stream 8 may be maintained at at least approximately 6 so that the constituents to be removed are present as oxyanions or oxyacids. In another embodiment, the pH of the feed stream 8 is maintained at or below the isoelectric point or point of zero charge (PZC) for the active compound, e.g., below the PZC of HIO, which is approximately pH 8.3 to 8.5, where HIO possesses a net positive charge and exhibits anion exchange properties. The HIO-PAN has been shown to adsorb arsenic at a pH of 8.3.

The adsorption medium 2 may be packed into a bed 10 that is used at the well head or other point of origin of a water supply. Packed beds 10 are known in the art and, therefore, the formation of the packed bed 10 is not described in detail herein. The packed bed 10 may include a housing within which the adsorption medium 2 is contained. In one embodiment, spherical beads of the adsorption medium 2 are packed so that sufficient spaces are present between the spherical beads to allow the feed stream 8 to pass through the packed bed 10. Once the feed stream 8 has passed through the packed bed 10 and the constituents are removed, the feed stream 8' may be distributed as potable water. Since the packed bed 10 is easily formed, the adsorption medium 2 may be an easy and economical way for small and mid-sized municipalities and other smaller-volume water users to remove the constituents from the feed stream 8. More specifically, the adsorption medium 2 may be used to remove arsenic contaminants in the feed stream 8 to a concentration below the newly reduced MCL. The arsenic may be removed at a lower capital and operating cost than is required to establish a centralized water treatment facility.

EXAMPLES

Example 1

Preparation of Solid Beads Having Ferric Hydroxide Incorporated in a PAN Matrix Solid beads of the adsorption medium 2 were prepared by dissolving approximately 70 g/L of iron oxide into concentrated nitric acid to form a metal solution. PAN was then dissolved in the metal solution to form a PAN-metal solution having approximately 3 wt % to approximately 5 wt % PAN. The PAN-metal solution was then sprayed through an air/nozzle device into an alkaline quenching bath having 3 M NaOH to form the solid beads. The solid beads were removed from the alkaline quenching bath, rinsed with ethanol, dried at a temperature of approximately 60° C., and screened to obtain a desired size fraction of the solid beads. Solid beads having PAN and ferric hydroxide were produced. The solid beads had approximately 30% Fe(III).

Example 2

Determination of Equilibrium Arsenic Capacity

Figure 3:
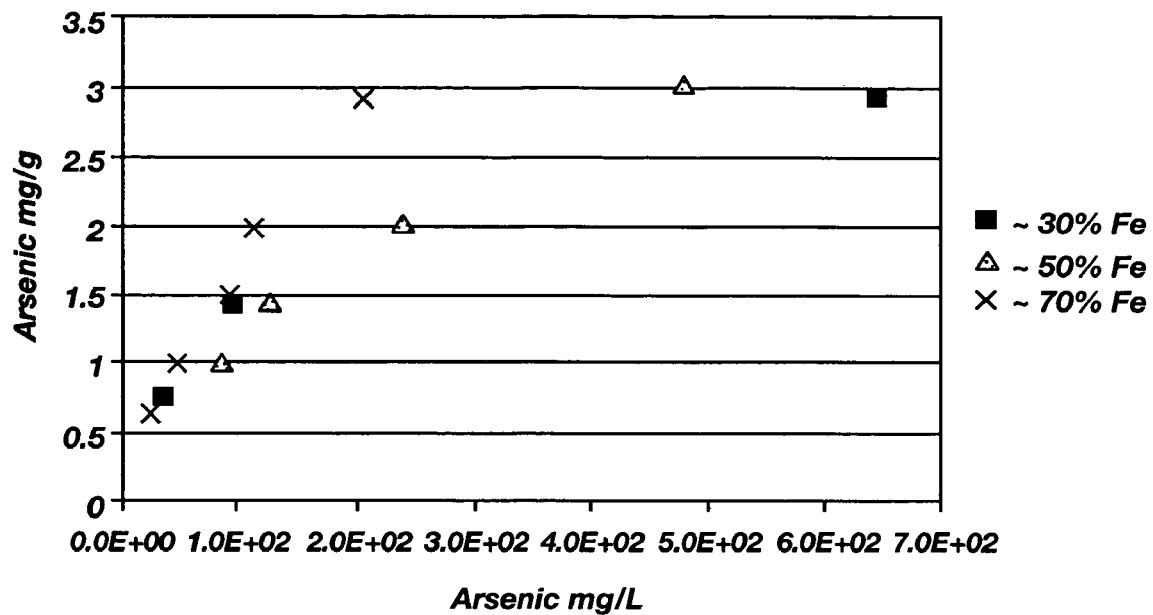
FIG. 3 is a graph of equilibrium isotherms showing iron loadings ranging from 30 wt % to 70 wt %.
Figure 4:
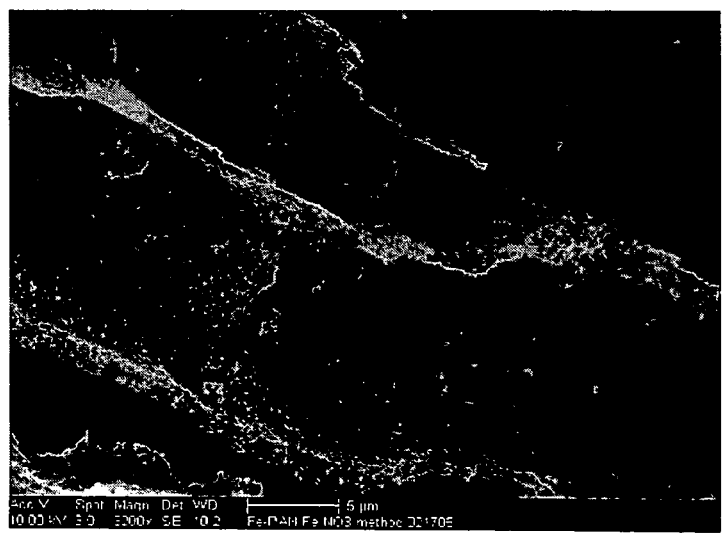
FIG. 4 is a SEM micrograph of the ferrihydrite adsorbent (3200×), showing macroporous channels.
Figure 5:
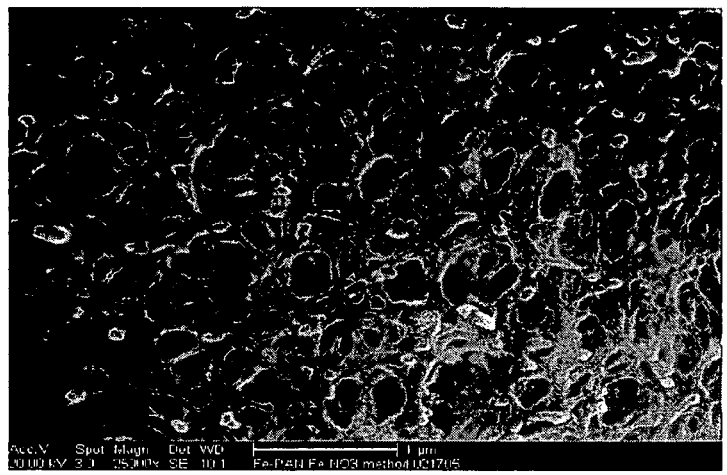
FIG. 5 is a SEM micrograph showing amorphous HIO aggregates within the PAN web.

The solid beads described in Example 1 were tested to determine equilibrium arsenic capacity at various feed concentrations. A known weight of the solid beads was contacted with a water sample having a specific arsenic concentration. Contacts between the solid beads and the water sample were repeated using different weights of the solid beads to obtain a plot of equilibrium arsenic concentration in the solid phase versus equilibrium arsenic concentration in the liquid phase. These plots are referred to as equilibrium isotherms. FIG. 3 shows iron loadings ranging from 30 wt % to 70 wt %. These equilibrium isotherms provide data at or near the low arsenic concentrations that exist in potable water in the United States. As FIG. 3 shows, at 70% iron loading, the adsorption medium 2 provides an arsenic loading of approximately 3 mg/g with 20 ppb arsenic in the feed stream 8. Since the concentration of arsenic is very low in the feed stream 8, there is a correspondingly low concentration gradient or driving force for mass diffusion into the solid phase. Therefore, 3 mg/g arsenic in the solid phase is quite high.

Example 3

Preparation of HIO

Preparation of the high surface area HIO is dependent upon the synthesis conditions. Therefore, in one embodiment, Fe salt (typically $Fe_3(NO_3)_3$—$9H_2O$ or $Fe_3Cl_3$—$6H_2O$) was dissolved in deionized water at room temperature. The solution was titrated to a pH of about 6.5 with a caustic solution (typically NaOH) with constant stirring. The titration is preferably done slowly to avoid local concentrations of high pH (for example, 0.8 M OH/M Fe/min.). This produced a fine precipitate of brown ferrihydrite nanoparticles. The solids were recovered and dried overnight at 40° C. The dry solids were ground to break up visible aggregates. It was not necessary to mill or otherwise vigorously grind the particles; simply breaking up the larger aggregates to facilitate bead formation (spraying) was sufficient.

HIO nanoparticles having surface areas of the dried aggregate consistently ranging from approximately 325-350 $m^2/g$ were reproducibly synthesized using the present method.

Example 4

Preparation of HIO-PAN

Preparation of the PAN-metal solution/suspension was initiated by adding the HIO particles to 99.9% DMSO at a weight:volume ratio of about 10 g HIO:150 mL DMSO. The PAN fibers were then added to the HIO/DMSO metal solution/suspension at a mass ratio of about 1:5, PAN:HIO, respectively, and heated to ~90° C. until no visible fibers remained. Once the PAN fibers were dissolved, constant stirring or mixing with slight heat (~40° C.) is generally necessary to maintain a fine suspension of the HIO particles. As will be recognized by a person of ordinary skill in the art, as long as the specified ratios are held constant, the total amounts can be scaled to the desired batch size.

Solid beads of the adsorbent medium were formed by spraying the HIO-PAN solution/suspension through an air/nozzle device into a stirred quenching bath of deionized water. The droplets solidified into beads upon contacting the quenching bath. Thus, the water volume of the bath should be large enough to sufficiently dilute the DMSO and produce the water-insoluble polymer beads. After the beads were formed in the quenching bath, they were allowed to continue circulating in the stirred bath for approximately 30 minutes. The adsorbent beads were collected and rinsed well with deionized water to remove excess DMSO, then dried overnight at 40° C. Once dry, the adsorbent beads can be sieved or otherwise separated into size fractions if desired. The beads are preferably stored dry in an airtight container until ready for use.

This resulted in the production of an inexpensive HIO-PAN composite adsorbent with approximately 85% HIO mass loading and a final surface area of between approximately 280 $m^2/g$ and approximately 300 $m^2/g$. The loading of the HIO active phase is at least three to five times higher than the ferric hydroxide produced in Example 1 and the method preserves the high surface area needed for maximum arsenic removal.

The 15% polymer content resulted in a macroporous bead having good mechanical properties desirable for operation in a fixed-bed. In addition, a 12% polymer content also resulted in a macroporous bead having good mechanical properties.

Example 5

Determination of Equilibrium Arsenic Capacity for HIO-PAN

Figure 6:
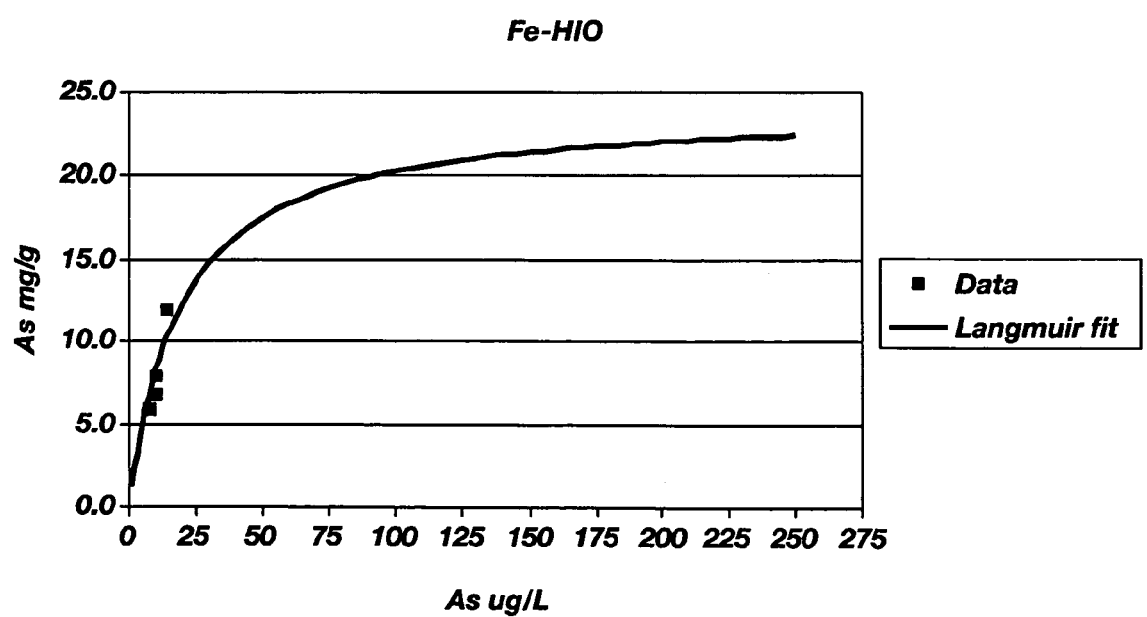
FIG. 6 is a graph of the HIO-PAN adsorption medium during process conditions, where the isotherm shows the As loading at low aqueous As concentrations.

Tests were performed to estimate the equilibrium arsenic loading of the new composite at the very low concentrations of interest (see, FIG. 6). More specifically, groundwater from S.E. Idaho was spiked with additional arsenate and As-73, a tracer to facilitate analysis. As illustrated in FIG. 6, the results of these tests indicate the HIO-PAN has a loading capacity of 7.5 to 10 mg As/g sorbent at the low As concentrations found in U.S. groundwater. Equilibrium studies have shown the material removal factor (Kd) for arsenate to be approximately $4 \times 10^6$ at the expected initial concentrations in U.S. groundwater, which is substantially higher than any currently available technology.

In addition, batch contacts have been performed to demonstrate the effectiveness of a caustic regeneration cycle on the surface area and the efficacy of arsenic removal from the resin. These regeneration experiments have shown that the material can be successfully regenerated without adversely affecting the adsorbent surface area.

Example 6

Optional Cartridge Design for POU

Figure 7:
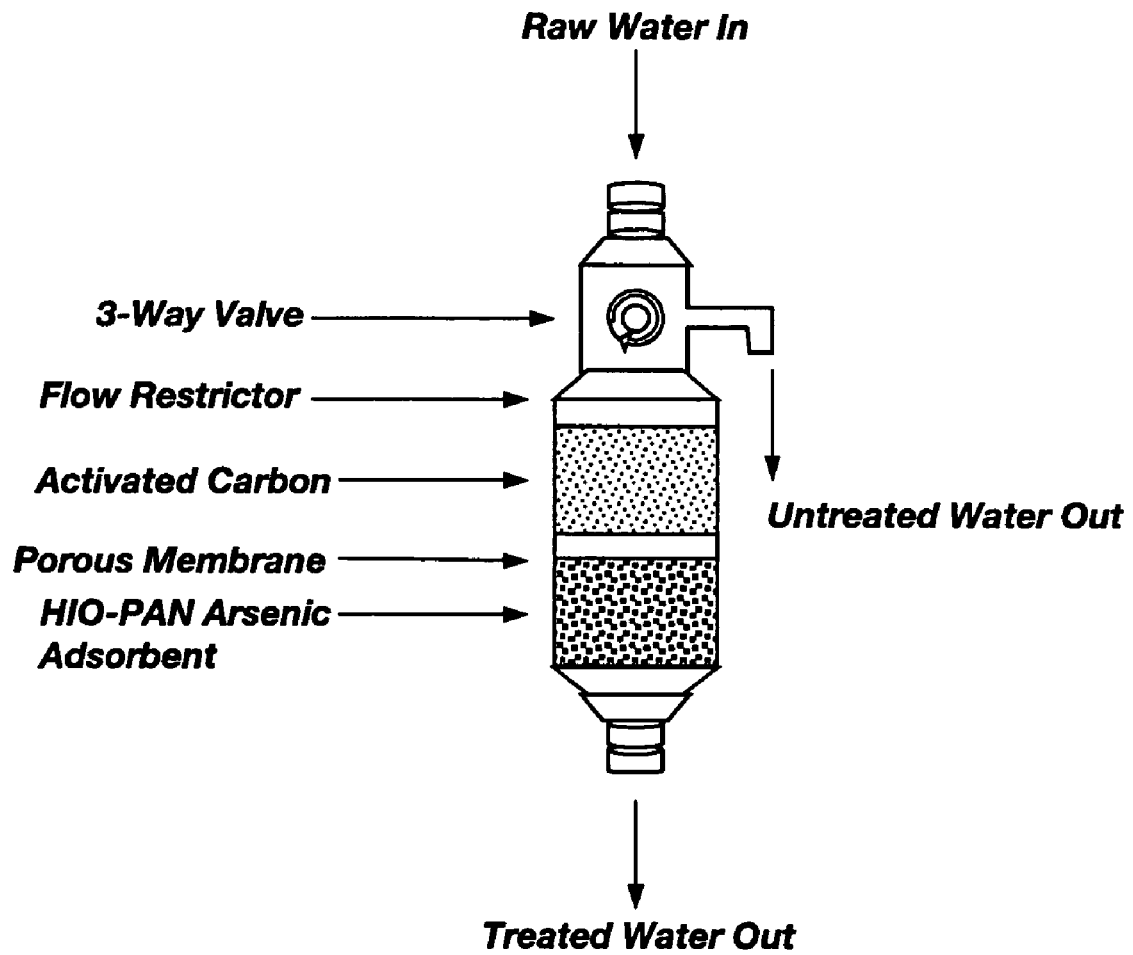
FIG. 7 illustrates one embodiment of a device for point-of-use (POU) or point-of-entry (POE) arsenic removal.

A portion of the cartridge consists of a small bed of activated carbon (approximately 4 cm in diameter×4 cm in length) followed by a small bed of HIO-PAN adsorbent (approximately 4 cm in diameter×4 cm in length). The activated carbon granules are held separate from the HIO-PAN beads by a thin porous membrane or in a separate cartridge that is configured to be connected to a cartridge containing the HIO-PAN adsorption medium. The adsorbent beds and/or porous membrane are enclosed within a cylindrical plastic housing of the cartridge, which may be threaded on one end for attachment and detachment to a conventional water faucet (FIG. 7). In one embodiment, water would first flow through the activated carbon bed to remove various non-toxic compounds responsible for poor taste and also function as a pre-filter to the HIO-PAN bed, thus extending the life of this material. The water then passes through the porous membrane and into the HIO-PAN bed where arsenic is removed, resulting in contaminant-free water at the cartridge outlet. The cartridge may also be constructed with a bypass valve that enables the sorbent beds to bypassed when water is desired for purposes other than consumption.

Based upon a HIO-PAN bed dimension of 4 cm by 4 cm, it is estimated that the cartridge device is capable of removing arsenic from potable water to less than 10 ppb for over two years for an average sized family of four. However, the actual life of the cartridge for a given application is a direct function of the arsenic concentration in the influent water and the size of the bed selected for commercial fabrication. As will be recognized by a person of ordinary skill in the art, the cartridge may be replaced when the design life is reached or when the media becomes clogged and the flow rate becomes undesirably low. The HIO-PAN material binds the arsenic and should pass TCLP testing. Therefore, the spent cartridge requires no special handling for disposal and may be disposed of in a sanitary landfill, i.e., simply discarded.

In another embodiment, the cartridge is sized accordingly to the water supply demands and attached at any point in the private water delivery system for POE treatment. For example, a cartridge-type device may be installed at the main water inlet for a home or business. In yet another exemplary embodiment, the cartridge may be configured to attach to a hand-pump device, such as those typically used in third world countries to draw water from tube wells. In this embodiment, the invention provides a cheap and easy method for removing arsenic from the myriad of arsenic-contaminated drinking water wells located throughout the Indian subcontinent.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of producing an adsorption medium, comprising:
    suspending at least one metal hydrite having a surface area of approximately 300 $m^2/g$ to approximately 375 $m^2/g$ in a liquid medium to form a metal solution;
    dissolving a matrix compound into the metal solution to form a matrix-metal solution; and
    depositing the matrix-metal solution into a quenching bath to form an adsorption medium comprising the at least one metal compound incorporated in the matrix compound.

2. The method according to claim 1, wherein dissolving a matrix compound into the metal solution to form a matrix-metal solution comprises dissolving polyacrylonitrile (PAN) into the metal solution to form a PAN-metal solution.

3. The method according to claim 1, wherein suspending at least one metal hydrite in the liquid medium comprises suspending at least one hydrated iron oxide in the liquid medium.

4. The method according to claim 3, wherein suspending at least one hydrated iron oxide in the liquid medium comprises suspending the at least one hydrated iron oxide in dimethylsulfoxide.

5. The method according to claim 2, wherein depositing the matrix-metal solution into a quenching bath comprises spraying the PAN-metal solution into a quenching bath consisting essentially of deionized water.

6. The method according to claim 1, wherein suspending at least one metal hydrite in a liquid medium comprises suspending a hydrated iron oxide (HIO) in dimethylsulfoxide (DMSO) at a weight:volume ratio of approximately 10 g HIO:30 ml DMSO.

7. The method according to claim 2, wherein dissolving PAN into the metal solution comprises dissolving polyacrylonitrile fiber into the metal solution at a mass ratio of approximately 1:5 PAN:HIO.

8. The method according to claim 6, further comprising heating the metal solution to a temperature of between approximately 80° C. and approximately 100° C., while mixing.

9. The method according to claim 7, wherein depositing the PAN-metal solution into the quenching bath comprises spraying the PAN-metal solution into the quenching bath to form the adsorption medium.

10. The method according to claim 1, further comprising impregnating a support with the adsorption medium.

11. The method according to claim 1, wherein depositing the matrix-metal solution into a quenching bath to form an adsorption medium comprises forming an adsorption medium comprising at least one of a metal hydroxide and a metal oxide substantially homogenously dispersed throughout the matrix compound.

12. The method according to claim 11, wherein spraying a PAN-metal solution into a quenching bath comprises producing the adsorption medium having from approximately 80% by weight to approximately 90% by weight of a metal in the form of an elemental metal, metal hydroxide, metal oxide, metal hydrite and mixtures thereof, and from approximately 10% by weight to approximately 20% by weight of the PAN.

13. A method of producing an adsorption medium having an increased metal loading, comprising:
dispersing ferrihydrite nanoparticles in a solvent to form a metal suspension;
dissolving polyacrylonitrile (PAN) into the metal suspension to form a PAN-metal solution;
depositing the PAN-metal solution into a quenching bath; and
producing an adsorption medium having a surface area of between approximately 250 $m^2/g$ and approximately 325 $m^2/g$.

14. The method of claim 13, further comprising heating the metal suspension.

15. The method of claim 13, wherein dispersing ferrihydrite nanoparticles in a solvent to form a metal suspension comprises dispersing the ferrihydrite nanoparticles in dimethylsulfoxide to form the metal suspension.

16. The method of claim 13, wherein depositing the PAN-metal solution into a quenching bath comprises depositing the PAN-metal solution into a quenching bath consisting essentially of deionized water.

17. The method of claim 13, further comprising introducing the adsorption medium into a water purification cartridge configured to retain the adsorption medium and to be porous to water.

18. The method of claim 17, further comprising configuring the water purification cartridge for attachment directly to a faucet.

19. An adsorption medium comprising ferrihydrite nanoparticles, each having a surface area of between approximately 300 $m^2/g$ and approximately 375 $m^2/g$ and a polymer matrix.

20. The adsorption medium of claim 19, wherein the polymer matrix is polyacrylonitrile.

21. The adsorption medium of claim 19, wherein the adsorption medium has a surface area of between approximately 280 $m^2/g$ and approximately 300 $m^2/g$.

* * * * *